United States Patent [19]

Padgitt

[11] 4,104,997

[45] Aug. 8, 1978

[54] MULTIPLE SLOPE IGNITION SPARK TIMING CIRCUIT

[75] Inventor: Kenneth Warren Padgitt, Arlington Heights, Ill.

[73] Assignee: Motorola, Inc., Schaumburg, Ill.

[21] Appl. No.: 650,655

[22] Filed: Jan. 20, 1976

[51] Int. Cl.$^2$ ............................................... F02P 5/04
[52] U.S. Cl. .............................. 123/117 R; 123/148 E
[58] Field of Search ....... 123/117 R, 117 D, 146.5 A, 123/148 E, 117 A

[56] References Cited

U.S. PATENT DOCUMENTS

| | | | |
|---|---|---|---|
| 3,277,875 | 10/1966 | Miki | 123/117 R |
| 3,738,339 | 6/1973 | Huntzinger et al. | 123/148 E |
| 3,749,073 | 7/1973 | Asplund | 123/146.5 A |
| 3,785,356 | 1/1974 | Niemueller | 123/146.5 A |
| 3,898,894 | 8/1971 | Aono et al. | 123/117 A |
| 3,910,243 | 10/1975 | Gau et al. | 123/117 R |
| 3,941,103 | 3/1976 | Hartig | 123/146.5 A |
| 3,955,723 | 5/1976 | Richards | 123/117 D |
| 4,016,843 | 4/1977 | Dorrego | 123/117 R |
| 4,020,807 | 5/1977 | Del Zotto et al. | 123/117 R |

FOREIGN PATENT DOCUMENTS 2,252,026  6/1975  France.

*Primary Examiner*—Charles J. Myhre
*Assistant Examiner*—Tony M. Argenbright
*Attorney, Agent, or Firm*—James W. Gillman; Phillip H. Melamed

[57] ABSTRACT

A multiple slope ignition spark timing circuit for an internal combustion engine is disclosed which electronically provides a spark timing signal having a piecewise linear advance angle versus engine speed characteristic. A magnetic pick-up sensor produces an AC signal having a frequency proportional to the rotational engine speed. This AC signal is coupled to a programmable voltage slope generator which generates a variable slope voltage that is used to produce the phase difference (advance angle) between a spark timing signal and the AC input signal. An independent timer apparatus produces various timing pulses which result in changing the advance angle versus engine speed characteristic at various predetermined engine speeds. An engine vacuum sensor adjusts the slope produced by the voltage generator and thereby results in a fixed amount of vacuum advance angle being added to the spark timing advance angle versus speed characteristic. The spark timing signals produced by the multiple slope ignition spark timing circuit are then used to ignite the fuel mixture in the cylinders of the internal combustion engine when the pistons are at desired predetermined positions in accordance with the engine speed and vacuum pressure.

37 Claims, 4 Drawing Figures

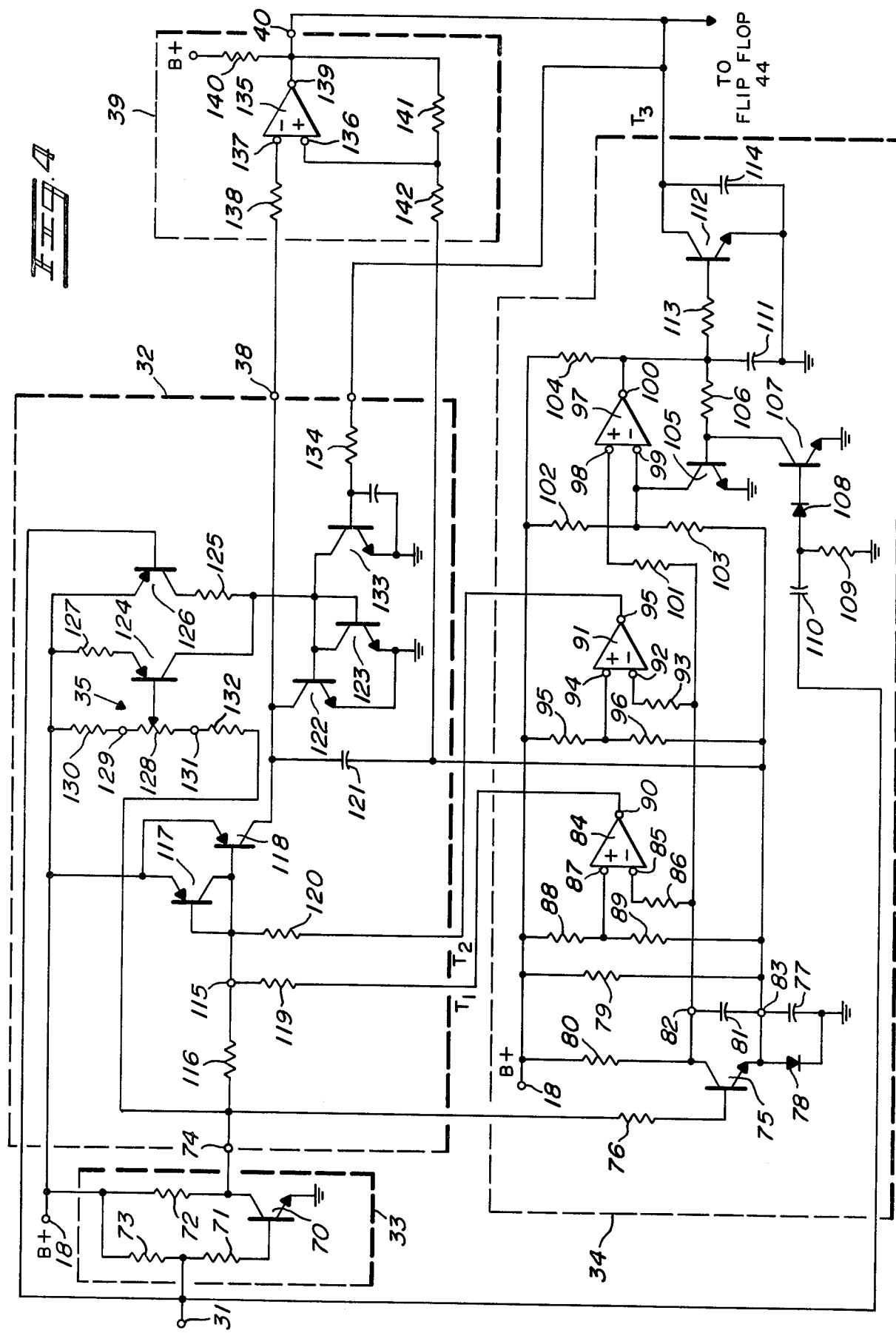

MULTIPLE SLOPE IGNITION SPARK TIMING CIRCUIT

BACKGROUND OF THE INVENTION

The invention relates generally to the field of ignition spark timing circuits for internal combustion engines and more particularly to the field of electronic ignition spark timing circuits in which a predetermined advance angle versus engine speed characteristic is produced.

In an internal combustion engine which uses a spark to ignite a fuel and air mixture in a cylinder, the proper timing of the spark with respect to the compression cycle of the cylinder has been a continuing problem. This problem exists because there are several different variables which influence the desired spark timing required for the efficient operation of the internal combustion engine. The ignition spark timing is primarily a function of the speed of the engine and the load on the engine, the engine load commonly being sensed by the amount of vacuum pressure produced by the engine. The engine speed is commonly measured in terms of the angular rotation of the engine crankshaft and the term "rotational speed of the engine" as used in this specification refers to the engine speed.

Prior art spark timing circuits have generally mechanically created an advance angle versus speed variation by using centrifugal force created by the engine crankshaft rotation to physically displace a cam which controls the amount of engine spark advance. The terms advance and advance angle as used in this specification generally refer to the phase difference between the occurance of a cylinder ignition spark and a predetermined reference position of the cyliner piston with respect to its compression cycle. The piston movement is determined by the crankshaft rotation and the advance angle is commonly measured in degrees of crank-shaft rotation.

Similarly, prior art vacuum advance systems have required the physical displacement of a cam as a function of the engine manifold pressure, this cam being coupled to a mechanical breaker system which produces a predetermined amount of spark timing advance as a function of engine manifold pressure. These prior art mechanical systems are extremely complex, difficult to adjust for a specific desired advance angle characteristic and are costly since they include a large number of mechanical parts which must be manufactured to very tight tolerances. In addition, the use of a large number of mechanical parts results in the unreliability of the spark timing circuit due to the frictional wearing out of these mechanical parts and the inherent unreliability of a very complex system. Thus the prior art mechanical spark timing circuits are not only hard to adjust but also require frequent spark timing adjustments due to the mechanical wearing out of the parts.

Prior art electronic spark timing circuits have obviated many of the disadvantages of the mechanical spark timing circuits but have been unable to accurately and simply reproduce the advance angle versus speed characteristic which was produced by the prior art mechanical systems. Some prior electronic systems develop a D.C. control voltage, by integration techniques, which is proportional to engine speed. This control voltage is then used to breakdown a zener diode and thereby create a different advance angle vs speed characteristic for all speeds above a predetermined speed. However, these systems can not respond rapidly to changes in speed because the control voltage is produced by integration. In addition, most prior art electronic systems have not provided a single complete circuit which produces a combined desired advance angle versus speed characteristic with a desired advanced angle versus engine manifold pressure characteristic (vacuum advance).

SUMMARY OF THE INVENTION

An object of the present invention is to provide an improved and simplified electronic ignition spark timing circuit for an internal combustion engine.

A more particular object of the invention is to provide an improved electronic spark timing ignition circuit for producing a spark timing signal having an advance angle which varies at a first linear rate as a function of engine speed for speeds below a predetermined speed and at a second linear rate for speeds above the predetermined speed.

Another object of the invention is to provide an improved electronic ignition spark timing circuit in which a predetermined advance angle versus engine speed characteristic is provided while simultaneously providing for the control of the advance angle in response to the load on the engine.

A still further object of the present invention is to provide an improved electronic ignition spark timing circuit in which a predetermined advance angle versus speed characteristic is produced and in which a speed independent amount of vacuum advance angle is added to the desired speed dependent advance angle versus speed characteristic.

In one embodiment of the present invention a multiple slope ignition spark timing circuit for an internal combustion engine is provided. The circuit comprises: a sensor for generating an AC input signal having a frequency and period proportional to the rotational speed of an engine, the input signal having alternate positive and negative cycles with respect to a predetermined reference level; apparatus for receiving the AC input signal and producing a first signal, after the commencement of one of the positive and negative cycles, which is varying at a first rate of change; apparatus coupled to the sensor for detecting the passage of at least a first predetermined period of time within a first predetermined amount of angular rotation of the engine after the commencement of the one of the cycles; apparatus coupled to the first signal producing apparatus for altering the rate of change of the first signal to a second predetermined rate of change in response to the occurance of a detection of the first time period within the first amount of angular rotation; and apparatus for producing a spark timing ignition signal by utilizing the magnitude of the first signal to produce an engine speed variable phase difference between the spark timing signal and the input signal, whereby a first spark timing phase difference versus engine speed relationship exists when the engine speed is above a predetermined speed at which the first time interval equals the time required for the first predetermined amount of angular rotation of the engine and a second relationship exists when the engine speed is below the predetermined speed.

Basically, a multiple slope ignition spark timing circuit for an internal combustion engine is provided and comprises a sensor which generates an AC input signal having a frequency proportional, and therefore a period inversely proportional to the rotational speed of the engine. This input signal has alternate positive and negative cycles with respect to a predetermined reference level. Apparatus receives this AC signal and electronically produces a spark timing signal having a difference in phase from the input signal which is a function of engine speed. The phase difference varies at a first linear rate for speeds just below a first predetermined speed and at a second linear rate for speeds just above the first speed. Thus a piecewise-linear advance angle versus speed relationship is produced by the present circuit, the relationship being an advance angle versus speed characteristic having a "break point" at a first predetermined speed. A "break point" is defined in the present specification as a point at which there occurs a relatively abrupt change in slope. The present invention also provides a vacuum (engine manifold pressure) sensor which produces a speed independent vacuum advance angle which is linearly added to the speed dependent advance characteristic previously produced. Thus a single electronic spark timing ignition circuit has been provided which produces a desired advance angle versus engine speed characteristic as well as modifying this characteristic by a fixed amount of advance angle in accordance with the load on the engine.

All of the aforementioned properties of the invention are accomplished in the preferred embodiment of the invention by the use of a programmable voltage slope generator which uses a capacitor and various current sources to produce a signal voltage capable of exhibiting various time rates of change. An independent timer circuit is coupled to the engine rotation sensor and generates predetermined timing pulses which selectively alter the signal rate of change produced by the programmable voltage generator when predetermined periods of time are detected during the time required for a predetermined amount of angular crankshaft rotation. In addition a vacuum sensor provides an input to the voltage generator which also affects the rate of change of the capacitor voltage. The changing voltage across the capacitor is compared with a predetermined level and when these levels are equal a spark timing pulse is produced which is subsequently coupled to the spark gap of a cylinder to ignite a fuel and air mixture which is compressed in the cylinder. The combination of the timer circuit and the programmable slope generator produce a predetermined advance angle versus speed relationship for the spark timing signal and the combination of the vacuum sensor and programmable generator produce a speed independent vacuum advance angle which is added to the speed dependent relationship produced by the generator and timer. Thus a single circuit is provided which simultaneously monitors the engine speed and engine load and accurately produces desired spark timing signals in accorance with both of these variables.

BRIEF DESCRIPTION OF THE DRAWINGS

For a more complete understanding of the invention reference should be made to the drawings, in which:

FIG. 4 is a schematic diagram illustrating several of the block components shown in FIG. 1.

DESCRIPTION OF THE PREFERRED EMBODIMENT

Figure 1:
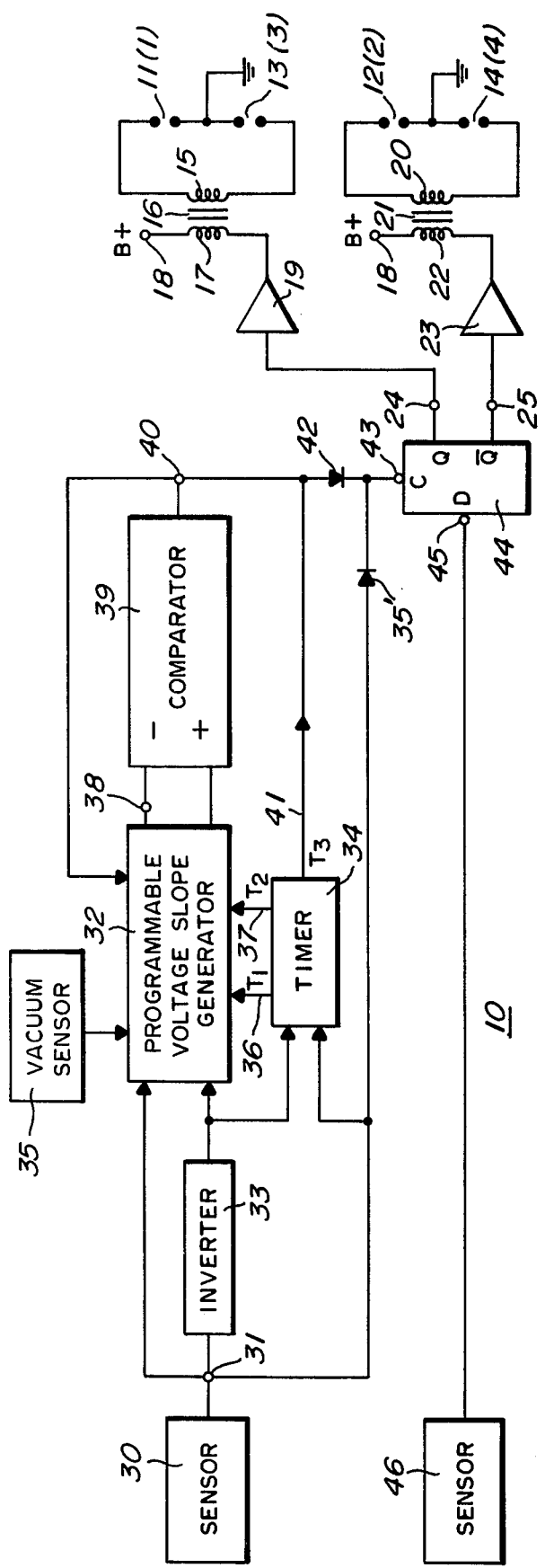
FIG. 1 is a combined block and schematic diagram of a multiple slope ignition spark timing circuit for an internal combustion engine.

FIG. 1 illustrates a spark timing ignition circuit 10 for a four cylinder internal combustion engine (not shown). Basically the circuit 10 provides ignition spark timing pulses to spark gaps 11, 12, 13 and 14 which correspond to the first, second, third and fourth cylinders of the engine respectively. The numbering of the cylinders indicates the firing order of the cylinders with respect to the rotation of the engine crankshaft (not shown).

The spark gaps 11 and 13 each have an end terminal connected to ground and an end terminal connected to each end of a secondary winding 15 of a transformer 16 which has a primary winding 17 coupled between a B+ terminal 18 and the output of a driver circuit 19. Similarly, spark gaps 12 and 14 each have terminals connected to ground and terminals connected to a secondary winding 20 of a transformer 21 having a primary winding 22 coupled between the B+ terminal 18 and the output of a driver circuit 23. The input to the driver circuit 19 is coupled to a terminal 24 and the input to the driver circuit 23 is coupled to a terminal 25.

Basically the spark timing ignition circuit 10 produces complimentary alternating high and low logic signals at terminals 24 and 25 which result in inducing inductive spark energy across the spark gaps of the cylinders at predetermined times of the cylinder compression cycle with respect to the crankshaft rotation. Spark energy is coupled to the first and third engine cylinders in a complimentary fashion such that the first time the secondary coil 15 produces a large amount of spark energy, the first cylinder (corresponding to spark gap 11) will be in its compression cycle while the third cylinder (corresponding to spark gap 13) will be in its after ignition (exhaust) cycle. Thus the initial excitation of the secondary coil 15 will result in igniting the fuel mixture in the first cylinder and no ignition of the fuel mixture in the third cylinder. However, upon the second excitation of the secondary coil 15, the third cylinder will be in its compression cycle position and therefore be ignited by a spark signal, whereas the first cylinder will be in its after ignition (exhaust) cycle and therefore not be ignited. The operation of the cylinders 2 and 4 (spark gaps 12 and 14) is identical. Thus the basic function of the spark timing circuit 10 is to supply terminals 24 and 25 with complimentary signals which have the desired phase relationships with respect to the cycle positions of the cylinders of the engine. These positions are directly related to the rotational position of the crankshaft of the engine.

The spark timing circuit 10 includes a sensor 30 which produces an AC signal having a frequency and period proportional to the rotational speed of the engine crankshaft. The AC signal has alternate positive and negative cycles with respect to some predetermined DC reference level. This AC signal is coupled to a terminal 31 which is directly coupled to a programmable voltage slope generator 32, an inverter circuit stage 33, a timer circuit 34 and the anode of a diode 35'. The invertor 33 has its output connected to the programmable voltage slope generator 32 and the timer 34.

A vacuum sensor 35 senses the engine manifold pressure and is coupled to the voltage slope generator 32. The timer 34 has two connections, 36 and 37, for coupling timing pulses $T_1$ and $T_2$, respectively, to the slope generator 32. The slope generator produces a voltage at an output terminal 38 which has a programmable slope (rate of change as a function of time).

The terminal 38 is coupled to the negative input side of a comparator 39 which also receives a reference voltage at its positive input side from the voltage slope generator 32. The comparator 39 produces a DC level shift, a signal pulse, at its output terminal 40 whenever the difference between the signal at the terminal 38 and the reference signal received at the comparator's positive input side changes polarity. Thus the comparator 39 merely functions as a common DC level comparator. The terminal 40 is directly coupled to the slope generator 32 and this connection serves as a hold loop for the comparator 39 and maintains the voltages at the terminals 38 and 40 constant until the programmable slope generator 32 has been reset.

The timer 34 is coupled to the terminal 40 by a connection 41 and the timer produces an inhibit signal $T_3$ on this connecting line which prevents the occurance of a high voltage at the terminal 40 under certain conditions. The terminal 40 is also connected to the anode of a diode 42. The cathodes of the diodes 42 and 35' are both connected to a clock terminal 43 of a D type flip-flop 44 which has a Q output connected to terminal 24 and a $\overline{Q}$ output connected to terminal 25. A data input terminal 45 of the flip-flop is directly connected to a sensor 46 which produces an output signal that provides information as to the rotational position of the crankshaft of the engine.

Figure 3:
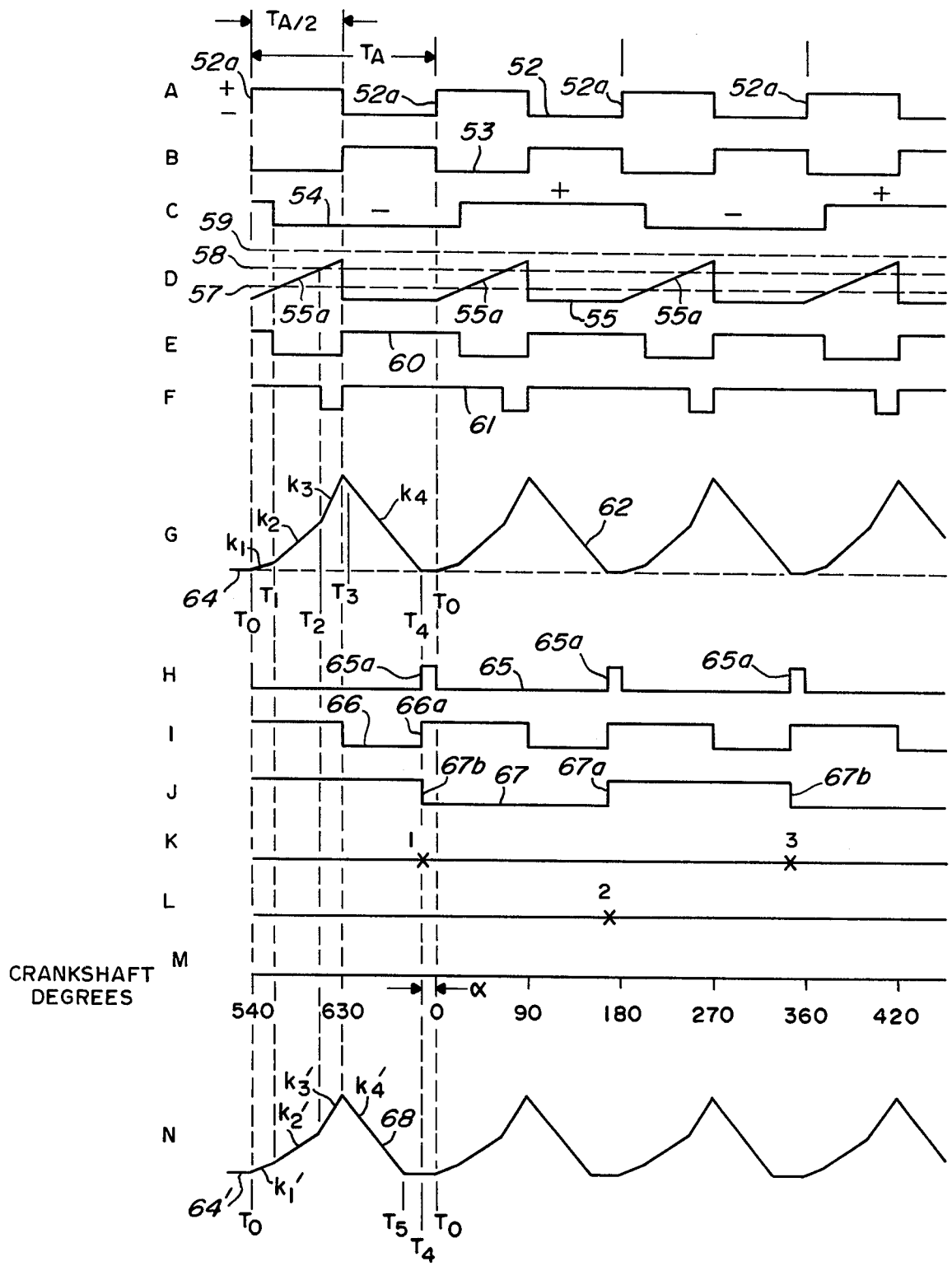
FIGS. 3A-N are a series of graphs illustrating the operation of the circuit shown in FIG. 1.

The sensor 30 is contemplated as producing a signal whose leading and trailing edges have a fixed relationship to the crankshaft rotational position which corresponds to a specific cylinder compression cycle position for each of the cylinders. In the present embodiment of the invention there are four cylinders, each being fired with a proper fuel mixture in compression once for every 720° of crankshaft rotation. The sensor 30 produces an AC signal (FIG. 3A) having a total of four leading and trailing edges which occur during every 360° of crankshaft rotation and the phase difference between the leading edges of the signal produced by sensor 30 and the spark timing signal at terminal 43 produced by the circuit 10 is the advance angle. The sensor 46 produces a signal (FIG. 3C) which merely contains information as to when a particular cylinder, such as cylinder one (spark gap 11), is in either the compression or expansion part of its cycle. Thus the period of the signal produced by the sensor 46 is equivalent to 360° of crankshaft rotation.

Figure 2:
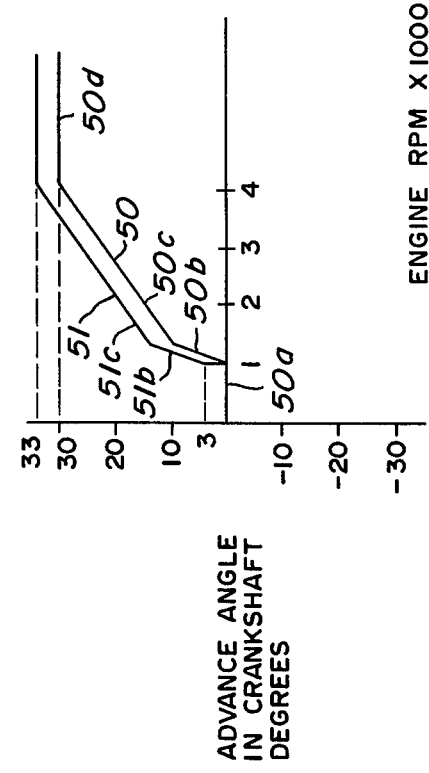
FIG. 2 is a graph illustrating two advance angle versus engine speed characteristics produced by the circuit shown in FIG. 1.

FIG. 2 illustrates two spark timing advance angle versus engine speed characteristics which are produced by the spark timing circuit 10 illustrated in FIG. 1. A first advance angle versus speed characteristic 50 illustrates the advance relationship created when no vacuum advance angle is called for by the vacuum sensor 35. A second advance versus engine speed characteristic 51 is illustrated to show how the vacuum sensor 35 will add a predetermined amount of vacuum advance angle to the advance versus engine speed characteristic produced by the circuit 10.

The characteristic 50 comprises a constant, zero advance angle section 50a for all engine speeds below 1,000 rpm, a first linear rate of advance versus speed section 50b for engine speeds between 1,000 and 1,300 rpm, a second linear advance versus speed section 50c for engine speeds above 1,300 rpm but below 4,000 rpm, and a substantially constant advance versus speed section 50d for engine speeds above 4,000 rpm. The advance angle versus speed characteristic 50 is typical of the mechanical advance characteristics produced by the prior art centrifugal force mechanical systems. The present invention synthesizes the angle versus speed characteristic 50 by the use of electronics instead of mechanical technology.

The vacuum advance curve 51 is identical to the advance curve 50 at speeds below 1,000 rpm. At speeds above 1,000 rpm, the vacuum advance curve 51 is offset from the advance curve 50 by a constant speed independent amount of vacuum advance equal to the vacuum advance angle called for by the vacuum sensor 35. Thus the present spark timing ignition circuit 10 has not changed the advance angle versus speed rate of change relationship which exists above 1,000 rpm, but has just modified the advance curve to reflect the amount of vacuum advance indicated by the sensor 35 as being required. Thus the portions 51b and 51c have exactly the same slope as the corresponding sections 50b and 50c, respectively. In addition, the inclusion of a vacuum advance by the circuit 10 has not resulted in altering the break point speeds of 1,000, 1,300 and 4,000 rpm.

The operation of the spark timing circuit 10 will first be described in general terms as to how the characteristics 50 and 51 are obtained, specific reference will be made to the waveforms and diagrams shown in FIGS. 3A–N. Subsequently the internal construction of the programmable voltage slope generator 32, the inverter 33, the timer 34, the vacuum sensor 35, and the comparator 39 will be discussed with reference to the schematic diagrams shown in FIG. 4. Again reference will be made to the waveform diagrams illustrated in FIGS. 3A–N to illustrate the functioning of each of these components in the spark timing circuit 10. In the FIGS. 3A–N, identical numbers will be used to refer to both the actual signal and the illustrated waveform.

Referring now to FIG. 3A, the voltage output of the sensor 30 which is produced at the terminal 31 is illustrated as a waveform 52. This voltage 52 is illustrated as a square wave having alternate and equal duration positive and negative cycles and whose leading (52a) and trailing edges bear a precise relationship to the crankshaft position which corresponds to a particular cycle position, such as top-dead-center, for each of the cylinders. The waveform 52 is illustrated as having a period of $T_A$ (a half cycle period $T_{A/2}$) and this period is inversely proportional to the speed of the engine rotation and is directly related to a specific amount of crankshaft rotation in degrees. A plot of crankshaft rotation in degrees is illustrated by the scale plotted in FIG. 3M. Thus the period $T_A$ represents 180° of crankshaft rotation. The leading edges, or positive going transactions, 52a of the signal 52 define the latest firing time for any particular pair of cylinders and are illustrated as occurring at times $T_O$. Thus the advance timing to be developed by the timing circuit 10 will be with respect to the leading edges of the signal in FIG. 3A.

A signal waveform 53 illustrated in FIG. 3B represents the output of the inverter 33 and merely illustrates that the inverter 33 simply inverts the signal 52 which it receives from the terminal 31. Thus the function of the inverter 33 is to develop an opposite polarity signal 53 corresponding to the signal 52.

Referring to FIG. 3C, the output of the sensor 46 is illustrated as a square waveform 54 having a period of $2T_A$. This waveform relates the general position (either compression + or expansion −) of one master cylinder with respect to crankshaft rotational position and the leading edge transitions of the waveform 52 produced by the sensor 30. The waveform 54 is slightly displaced from waveform 52 by a fixed amount of crankshaft degrees to avoid any ambiguity in the cycle state of the master cylinder during the positive going transitions of the waveform 52. The basic function of the sensor 46 is to relate the cycle position of a specific master cylinder, which is merely one of the 4 cylinders, to all of the spark timing signals generated by the circuit 10 so that each cylinder will only receive its own spark timing signal and not the spark timing signal created to ignite the fuel mixture in a different pair of cylinders. Thus the signal 54 is generated just to insure the proper gating of the spark timing signals to the proper cylinders. Whereas the signal 52 is used to define the latest position at which a spark signal can occur during the cycle of any cylinder, and is also used to create a controllable advance angle which has a predetermined angle versus speed characteristic.

The sensors 30 and 46 are contemplated as being magnetic pick-up devices, which have signals induced in them by magnets rigidly attached to the crankshaft or rotated in synchronization therewith. These sensors are well known in the field of electronic ignition systems and their construction is not claimed as part of the present invention.

The timer 34 receives the signal 52 from the terminal 31 and produces an internal signal 55 having a ramp function 55a with a fixed rate of rise during the positive cycle of this signal. This internal signal 55 is illustrated in FIG. 3D. During the negative cycle of the signal 52, the signal 55 is maintained at substantially zero. The ramp function signal is used to generate specific timing pulses $T_1$, $T_2$, and $T_3$ by comparing the ramp signal magnitude with predetermined voltage levels 57, 58 and 59 (shown dashed), respectively. Thus when the ramp function 55a exists for at least a time $T_1$ the magnitude of the ramp function will equal the voltage level 57 and a pulse output will be generated on line 36. This pulse output is illustrated in FIG. 3E as a waveform 60. If the ramp 55a exists for at least a period of time equal to $T_2$, then the ramp signal will equal the voltage level 58 and a pulse will be generated on line 37, this pulse corresponds to the waveform 61 illustrated in FIG. 3F. The creation of pulses on the connecting line 41, which occur when the ramp 55a exists for at least a time $T_3$ are created in a similar manner.

The basic function of the timer 34 is to produce a series of time detecting pulses whenever the positive portion of the signal 52 exists for at least a predetermined time interval. Since this positive portion of the waveform 52 directly corresponds to a specific number of crankshaft degrees, and therefore corresponds to a specific amount of angular rotation of the crankshaft of the engine, the timer 34 acts as an apparatus for detecting the passage of at least a first predetermined period of time within a specified amount of angular rotation of the engine after the commencement at $T_0$ of the leading edge of the input signal 52 produced by the sensor 30. It should be noted that the times $T_1$, $T_2$ and $T_3$ are fixed durations of time after the occurance of a leading edge at time $T_O$, however, the period $T_A$ is not a fixed time, but is related to the speed of the engine.

FIG. 3G represents a varying voltage 62 produced by the programmable voltage slope generator 32 at its output terminal 38 in response to the generation of the waveforms illustrated in FIGS. 3A-F. The waveform 62 illustrates that the slope generator 32 initially creates a rising voltage having a rate of change $k_1$, between the leading edge of the input signal 52 (at time $T_0$) until the occurrence of the predetermined time $T_1$. Upon the detection of time $T_1$, the generator 32 receives the signal 60 on the input line 36 which causes the generator to alter the slope of the rising voltage 62 to a new rate of change $k_2$ until a detection of the time $T_2$ occurs. When the time $T_2$ has occurred, the slope generator receives the signal 61 on the input line 37 which results in the creation of a new rate of rise $k_3$ until the negative cycle of the input signal 52 has commenced (this occurs at $T_{A/2}$). During the negative cycle of the signal 52 the slope generator 32 decreases the voltage at the terminal 38 according to a constant linear rate of change $k_4$. When the voltage 62 once again reaches its initial starting level 64 at a time $T_4$ it will remain at this level until the occurrence of another leading edge 52a of the input signal 52 illustrated in FIG. 3A.

It is particularly significant to note that any changes in the rotational speed of the crankshaft, which therefore affects the time magnitude of the input signal period $T_A$, will not affect the magnitude of the slopes generated by the slope generator 32. However the speed of the crankshaft rotation will affect whether a time detection of a time interval of $T_1$, $T_2$ or $T_3$ will occur. Therefore the magnitude of the signal 62 at the time $T_{A/2}$ will change for any variation in the speed of the crankshaft rotation however the value of the slopes ($k_1$–$k_4$) created by the slope generator 32 will not be altered at all. All that will happen is that some of the time detections may not occur if the rotational speed of the crankshaft produces a ramp function 55a which never reaches the predetermined voltage levels (57–59) which cause the timer 34 to generate control voltages for signalling the slope generator 32 to change the slope of the waveform 62.

At very high speeds the magnitude of $T_{A/2}$ is so small that a $T_1$ detection never occurs before the expiration of the time $T_{A/2}$. Therefore the waveform 62 corresponding to this condition will simply change at the predetermined rate $k_1$ which initially existed after the leading edge 52a occurred. The signal 62 will still decay after the time $T_{A/2}$ at the same fixed rate $k_4$ which the waveform 62 illustrated in FIG. 3G is shown to be decaying at.

The comparator 39 receives the signal 62 produced at the terminal 38 (FIG. 3G) and compares this signal to a voltage reference level which in the preferred embodiment of the invention corresponds to the reference level 64 illustrated in FIG. 3G. During the period of equality of these signals, the comparator produces an output signal 65 at the terminal 40 which is illustrated in FIG. 3H. This waveform has a high voltage level during the period of equality of the signals being compared and a low voltage level whenever the input signal 62 is greater than the reference level 64. Thus the waveform 65 exhibits a positive going edge 65a at the time $T_4$ when the signal 62 is reduced to its original voltage level. This time $T_4$ is a function of all of the voltage slopes which went into the creation of the magnitude of the signal 62 up until the time $T_{A/2}$ and also is a function of the slope $k_4$. Thus the leading edge 65a of this waveform therefore represents a timing signal occurrence which is a function of all of these slopes. Since some of these slopes may not occur if the engine speed (magnitude of $T_A$) is such that some of the time detections do not occur, the spark timing circuit 10 will thereby create an advance angle versus speed characteristic which will exhibit a piecewise linear variation of the advance angle as a function of speed.

The use of single rise rate and single fall rate waveforms in an ignition spark timing circuit is known in the prior art. Such a circuit is shown in a copending U.S. application to Gunderson, Ser. No. 537,725, filed Dec. 31, 1974, entitled "An Electronic Spark Timing Adjustment Circuit" and assigned to the same assignee as the present invention. This prior art system, which is hereby expressly incorporated by reference into the present specification, shows circuitry for using a single rise rate and single fall rate to produce a spark timing signal which is totally independent of engine speed. Therefore the prior system is not at all directed to the problem or solution solved by the present invention, which is to provide a predictable and desired advance angle versus speed characteristic.

The waveform 66 illustrated in FIG. 3I represents the voltage signal waveform present at the clock input terminal 43 which is equivalent to the signal 52 added to the signal 65. This summing signal 66 illustrates that if for some reason, such as the occurrence of a time detection $T_3$, no positive output signal is produced at the terminal 40 during the negative cycle of signal 52, then the signal present at the terminal 43 will still have a leading edge created by the action of the diode 35' and the signal 52. The leading edges 66a define the advance produced by the circuit 10.

The signal 67 illustrated in FIG. 3J represents the output of the D type flip-flop 44 at its Q terminal (24) in response to the presence of all of the above-illustrated waveforms (3A-3I). Thus the gating of the signal 54 from the sensor 46 and the signal 66 result in the production of the signal 67 at the terminal 24. The signal 67 is the resultant spark timing signal and has leading and trailing edges 67a and 67b which determine the timing of the cylinder ignitions. This signal will generate spark energy across the secondary winding 15 whenever the output of the driver circuit 19 goes low, which occurs at the trailing edge 67b and corresponds to the low portion of the signal 67.

FIG. 3K illustrates that the spark gap 11 (cylinder 1) will respond to the first such low transition (67b) of the signal 67 whereas the spark gap 13 (cylinder 3) will respond to the second such transition. This alternating response of the cylinders is due to the fact that their compression-ignition cycles are 360 crankshaft degrees out of phase from each other. Thus when cylinder one has a fuel mixture ready to be ignited in it cylinder three is expelling its previously ignited gas mixture. FIG. 3K similarly illustrates that the spark gaps 12 and 14, which correspond to the cylinders 2 and 4, are alternately excited at the leading edges 67a of the signal 67.

While the basic concept of generating a spark timing signal by producing a voltage which rises at a first predetermined rate and discharges at a second predetermined rate is shown in the previously referred to copending application of Gunderson, that prior art circuit does not suggest using fixed time detections which occur within a first predetermined amount of angular rotation of the crankshaft of the engine to alter the rate of change of the signal which will subsequently be used to generate a spark timing signal. These independent detections of predetermined time intervals create "break points" by which the angular advance of the spark timing signal is varied in a piecewise fashion as a function of engine speed. The break points are determined by the crankshaft rotational speeds at which the predetermined time intervals are equal to the time ($T_{A/2}$) required for a predetermined amount of angular rotation of the engine to occur. During this angular rotation time detections will occur and signal the slope generator 32 to change the slope of the voltage (62) which determines the advance angle of the spark timing signal. The advance in the above-illustrated figures is the time difference between $T_0$ and $T_4$, as measured in degrees of crankshaft rotation.

Referring now to FIG. 3N, with no vacuum advance angle called for, the voltage slope generator will produce the waveform 62, but when a vacuum advance angle is called for by the sensor 35, the waveform 68 illustrated in FIG. 3N will be produced. This waveform will have altered rising slopes $k_1'$, $k_2'$ and $k_3'$ which are equal to the previous slopes $k_1$, $k_2$ and $k_3$, respectively, minus a fixed amount. This fixed amount being determined by the action of the vacuum sensor 35. The discharging or declining voltage rate $k_4'$ in the waveform 68 is identical to the rate $k_4$ shown in FIG. 3G. Because of the decrease in the rates $k_1'$, $k_2'$ and $k_3'$ a larger advance angle will now occur since the waveform 68 will now reach its initial starting point voltage 64' at an earlier time $T_5$. The difference between $T_4$ and $T_5$ represents the angular advance which is called for by the vacuum sensor 35. Obviously the effect of the vacuum sensor will not affect the location of the break points in the advance angle versus speed curve for the spark timing signal. This is illustrated by the vacuum modulated advance curve 51 illustrated in FIG. 2. In addition, the present embodiment of the invention contemplates having the vacuum sensor 35 uniformly decrease all of the charging rates $k_1-k_3$ of the output of the slope generator 32. This results in the production of a speed independent vacuum advance angle which is then linearly added to the advance angle versus engine speed relationship previously generated by the slope generator 32. The fact that a uniform reduction in the rates $k_1-k_3$ will result in a speed independent additional advance angle will be further explained subsequently in this specification. The addition of this advance angle occurs uniformly with the minor exception that for all speeds slower than 1,000 rpm, the time detection $T_3$ will occur and cause the spark timing advance angle to be zero since the leading and trailing edges 67a-67b spark timing signal 67 will then coincide with the leading edges 52a of the waveform 52.

The detailed operation of the slope generator 32, the timer 34, the vacuum sensor 35 and the comparator 39 will now be explained with reference to the circuitry illustrated in FIG. 4 as well as the waveforms illustrated in FIGS. 3A-N. By way of the following explanation, it will be seen that the present invention circuitry does produce the graphs illustrated in FIGS. 2 and 3A-N.

Referring now to FIG. 4, a schematic diagram illustrates the electrical components which typically comprise embodiments of the slope generator 32, the inverter 33, the timer 34, the vacuum sensor 35, and the comparator 39. The components in FIG. 4 which correspond to identical components in FIG. 1 have been given identical numbers and are identically connected.

The inverter 33 is shown dashed and basically comprises an NPN transistor 70 having its emitter connected to ground, its base connected to the terminal 31 through a resistor 71 and its collector connected to the B+ terminal 18 through a load resistor 72. Base bias to the transistor 70 is supplied by a resistor 73 connected between the B+ terminal and terminal 31. The output of the inverter stage 33 is obtained from the collector of the transistor 70 which is connected to a terminal 74. Thus the inverter 33 merely is a polarity reversing isolation stage which receives the signal 52 at terminal 31 and produces the signal 53 at terminal 74.

The timer 34, shown dashed, includes an NPN transistor 75 which has its base coupled to the terminal 74 through a resistor 76. The emitter of the transistor 75 is coupled to ground through a parallel connection of a capacitor 77 and a diode 78, the diode having its cathode directly connected to ground. A resistor 79 is coupled between the B+ terminal 18 and the anode of the diode 78 to provide bias for the diode. A load resistor 80 is coupled between the collector of the transistor 75 and the B+ terminal, and a timing capacitor 81 is directly coupled across the collector and emitter terminals of the transistor 75 which are also directly coupled to terminals 82 and 83, respectively.

When the transistor 75 receives a low voltage signal from the terminal 74, the transistor will be cut off and the voltage at the terminal 82 will rise at a predetermined rate, which will be exponentional, due to the charging of the capacitor 81 by current flowing through the resistor 80. When the base of the transistor 75 receives a positive signal from the terminal 74, the transistor 75 will be saturated and this will result in a rapid discharging of the voltage across the capacitor 81. Thus the voltage at the terminal 82 will correspond to the waveform 55 illustrated in FIG. 3D when a signal corresponding to the waveform 53 is received at the base of the transistor 75. The signal 55 at the terminal 82 represents a capacitor timing signal which is used to produce the timing pulses which occur at predetermined time intervals after the occurrence of the leading edges 52a of the signal 52 produced by the sensor 30.

The timer also includes a DC level comparator circuit 84 which has a negative input terminal 85 coupled to terminal 82 through a resistor 86 and a positive input terminal 87 coupled to B+ through a resistor 88 and to terminal 83 through a resistor 89. Thus the comparator 84 receives a fixed DC reference level voltage at its terminal 87 and compares this voltage with the voltage present at the terminal 82. The voltage levels at terminals 82 and 85 are considered to be equal since the comparator 84 has a high input impedance and therefore exhibits negligible loading effects. The comparator produces an output voltage at an output terminal 90 and this voltage is high (open circuited) whenever the DC level at terminal 87 exceeds the DC level at terminal 85. Whenever the voltage at terminal 85 is greater than the voltage at terminal 87, the comparator 84 produces a low voltage at its output terminal. DC level comparators of this type are well known in the prior art and are readily available.

When the terminal 82 has a signal which corresponds to the signal 55 and the DC reference voltage produced at the terminal 87 corresponds to the reference level 57, the signal at the output terminal 90 will correspond to the waveform 60 illustrated in FIG. 3E. Thus the comparator 84 produces output timing pulses which occur whenever a fixed predetermined time period $T_1$ is detected after the occurrence of a leading edge 52a and before the beginning of the negative cycle of the signal 52 at the time $T_{A/2}$. The time $T_{A/2}$ is related to engine speed and is also related to a predetermined amount of angular rotation of the engine. Thus the comparator 84 detects the passage of the time $T_1$ within a predetermined amount of angular rotation of the engine.

A second DC comparator circuit 91 is similarly connected and has a negative input terminal 92 coupled to the terminal 82 through a resistor 93, a positive input terminal 94 coupled to B+ through a resistor 95 and to terminal 83 through a resistor 96, and an output terminal 95. The DC voltage level at the terminal 94 corresponds to the DC reference level 58 illustrated in FIG. 3D and the signal produced at the output terminal 95 corresponds to the signal 61 illustrated in FIG. 3F. Thus the comparator 91 produces a timing signal at the output terminal 95 which detects the passage of a time interval $T_2$, when this time interval occurs between the leading edges 52a of the input signal present at the terminal 31 and the half cycle time period $T_{a/2}$.

A third DC level comparator 97 has a positive input terminal 98, a negative input terminal 99 and an output terminal 100 all connected in the following manner. The terminal 98 is coupled to the terminal 82 through a resistor 101. The terminal 99 is coupled to B+ through a resistor 102 and to the terminal 83 through a resistor 103. The output terminal 100 is coupled to the B+ terminal 18 through a resistor 104. The DC reference level present at the terminal 99 corresponds to the reference level 59 illustrated in FIG. 3D. However, since this reference level is coupled to the negative terminal of the comparator 97, the signal at the output terminal 100 will remain low until the voltage at the terminal 82 exceeds this predetermined reference level. Thus the comparator 97 detects the passage of a third predetermined time interval $T_3$ by producing a high voltage at its output terminal 100.

It is important to remember that the rate of change of the signal 55 at the terminal 82 depends solely upon the charging rate of the capacitor 81 and is therefore independent of the frequency and magnitude of the signal 52 present at the terminal 31. Thus for higher frequency signals, while the time magnitude of the half cycle period $T_{a/2}$ will be less, the rate of change of the signal 55 during its ramp portion 55a will remain unaltered. This insures the fact that the timer 34 will function as an engine speed independent time detector. In addition, the time detections will not depend upon the magnitude of the signal 52.

An NPN transistor 105 has its base coupled to the terminal 100 through a resistor 106, its emitter coupled to ground and its collector coupled to the terminal 99. The components 105 and 106 form a latch circuit which maintains the output voltage at the terminal 100 at a high level once the voltage at the terminal 98 exceeds the voltage at the terminal 99. This latch circuitry is reset by the occurrence of one of the leading edges 52a of the input signal 52 present at terminal 31. The resetting circuitry comprises an NPN transistor 107 having its emitter connected to ground, its collector connected to the base of the transistor 105, and its base connected to the cathode of a diode 108. The anode of the diode is coupled to ground through a resistor 109 and coupled to the terminal 31 through a differentiating capacitor 110. Thus the occurrence of a leading edge 52a will cause a positive pulse to occur at the base of the transistor 107 which in turns results in the saturation of this transistor and the turning off of the transistor 105, thereby resetting the latch circuitry for the comparator 97 which comprises the transistor 105 and the resistor 106. Thus the negative cycles of the input signal 52 reset the voltage on the capacitor 81 by saturating transistor 75 and the leading edges 52a of the positive cycle of the input signal 52 reset the latch of the comparator 97.

The output terminal 100 is coupled to ground through a capacitor 111 and is coupled to a base of an NPN transistor 112 through a resistor 113. The emitter of the transistor 112 is connected to ground and the collector is coupled to ground through a capacitor 114 and is directly coupled to the terminal 40. Since a high voltage at the terminal 100 will saturate the transistor 112, the comparator 97 will therefore produce a low voltage at the terminal 40 whenever a time interval of $T_3$ is detected within the positive cycle of the input signal 52 present at the terminal 31. This low voltage at the terminal 40 will be maintained until the latch of the comparator 97 is reset by the occurrence of a leading edge 52a of the input signal. Thus the detection of a time period $T_3$ will result in effectively preventing the comparator 39 from responding to the signal at terminal 38. This results in a zero degree angular advance, since now the signal at the summing terminal 43 will correspond to the input signal 52. Thus for very slow engine speeds, where time detections of $T_3$ occur during the positive half cycle period $T_{a/2}$, a constant zero advance is maintained. This corresponds to the section 50a in FIG. 2.

The timer 34 comprises all of the components 75 through 114. Basically the timer looks at the positive half cycle of the input signal 52 and determines the relative magnitude of the half cycle time period $T_{A/2}$ with respect to the predetermined time intervals $T_1$, $T_2$ and $T_3$. Any timing device which is set by the occurance of a leading edge and produces pulses at fixed times thereafter can be substituted for the timer 34.

The operation and structure of the slope generator 32 will now be discussed in detail. The basic function of the programmable slope generator 32 is to provide a variable slope voltage at the terminal 38 which results in the comparator 39 producing a desired spark timing ignition signal. The slope generator 32 responds to the detections of the time periods $T_1$, $T_2$ and $T_3$ when these time periods occur within the positive half cycle of the signal 52. The slope generator responds to these detections by altering the slope of the signal produced at the terminal 38. Thus the time detections produced by the timer 34 create the break points in the advance angle versus speed characteristics 50 and 51 which relate the phase of the spark timing signal 65 produced by the comparator 39 to the occurrence of the leading edges 52a of the input signal 52 present at the terminal 31.

The inverted input signal 53 at the terminal 74 is coupled to a current source control terminal 115 through a resistor 116. The terminal 115 serves as a control terminal for a current source comprising PNP transistors 117 and 118. The base and collector terminals of the transistor 117 are directly connected to each other and to the base of the transistor 118 which is directly connected to the terminal 115. The emitters of the transistors 117 and 118 are both directly connected to the B+ terminal 18. The terminal 115 is coupled to the terminal 90 of the timer 34 by a resistor 119 and to the output terminal 95 of the timer 34 through a resistor 120. The collector of the transistor 118 is directly connected to the terminal 38 and connected to the terminal 83 of the timer 34 through a capacitor 121. On the positive half cycle of the input signal 52, terminal 74 is held at ground and a low voltage is produced at the terminal 115 which activates the current source comprising transistors 117 and 118. This results in the initial charging up of the capacitor 121 at a first predetermined rate determined by the resistance of the resistor 116.

If the predetermined time period $T_1$ is detected within the positive half cycle, a low voltage is produced at the output terminal 90 which results in altering the amount of current which is charging up the capacitor 121. This results because the current supplied by the transistors 117 and 118 is now determined by the parallel combination of the resistors 116 and 119. If the detection of a time period $T_2$ occurs within the positive half cycle of the input signal, then the output voltage at the terminal 95 will switch to a low voltage level. This results in again altering the charging current being supplied to the capacitor 121. Thus after a $T_2$ detection, the charging rate of the capacitor 121 is determined by the parallel combination of the resistors 116, 119 and 120. FIG. 3G illustrates the signal 62 present at the terminal 38 when time detections of both the time periods $T_1$ and $T_2$ are made during the positive half cycle of the input signal 52. During the negative half cycle of the input signal, a high voltage is produced at the terminal 115 which results in inactivating the current source which consists of transistors 117 and 118.

The terminal 38 is directly coupled to the collector of an NPN transistor 122 which provides a discharge path for the voltage which was built up across the capacitor 121 during the positive half cycle of the input signal. The emitter of the transistor 122 is connected to ground and its base is directly coupled to the base and collector terminals of an NPN transistor 123 which also has its emitter connected to ground. The base of the transistor 123 is directly coupled to the collector of a PNP transistor 124 and is coupled through a resistor 125 to the collector of a PNP transistor 126. The emitter of the transistor 126 is directly connected to the B+ terminal and the emitter of the transistor 124 is coupled to B+ through a resistor 127. The transistors 124 and 126 control the amount of capacitor discharge current permitted by the current source configuration comprising transistors 122 and 123.

The base of the transistor 126 is directly coupled to the input terminal 31 and thus the transistor 126 is activated only during the negative half cycle of the input signal 52. The base of the transistor 124 is coupled to the wiper arm of a potentiometer 128. The potentiometer provides a variable resistance in accordance with the engine manifold pressure since the vacuum sensor 35 controls the position of the wiper arm. A first end terminal 129 of the resistive element of the potentiometer 128 is coupled to B+ through a resistor 130 and a second end terminal 131 of the resistive element is coupled to the terminal 74 through a resistor 132. Thus the transistor 124 is actuated during the positive half cycle of the input signal 52 to control the discharging of the capacitor 121.

An NPN transistor 133 serves to selectively prevent any discharging of the capacitor 121 through the transistor 122. The collector of the transistor 133 is directly coupled to the base of transistor 122. The emitter of transistor 133 is connected to ground and its base is coupled to the terminal 40 through a resistor 134. The components 122 through 134 control the discharging of the voltage developed across the capacitor 121 in the following manner.

During the negative half cycle of the input signal 52, a negative voltage is present at the base of the transistor 126 which activates this transistor and provides a current through the diode connected transistor 123 which biases the transistor 122 to provide an identical discharge current for the capacitor voltage present at the transistor 352 conducts, its collector voltage is greatly reduced to thereby permit transistor 354 to conduct and at the same time capacitor 356 to be charged to almost the full magnitude of the B+ supply. When transistor 352 ceases to conduct, charge on capacitor 356 is gradually dissipated, principally through resistors 348 and 350 thereby maintaining transistor 354 in a conductive condition for a certain time interval after transistor 352 has ceased conducting. In this way current continues to flow from the B+ supply, through resistor 348, through the emitter-collector circuit of transistor 354 and into sum line 132 for a predetermined interval. As the charge on capacitor 356 is dissipated, the current in transistor 354 similarly progressively diminishes and the resultant input to sum line 132 also gradually diminishes. FIG. 8 illustrates a possible characteristic 380 of the current which forms the start advance signal from circuit 118. As can be seen, the circuit characteristics may be selected to provide a constant advance for a short time interval after the ignition switch contacts have opened which thereafter progressively decays to zero. Alternatively, the characteristics of the circuit could be selected to provide an advance characteristic 382 which essentially immediately begins to progressively decrease toward zero as soon as the start contacts are released.

The present circuit provides a mode of engine operation which has been found to be especially beneficial during starting and warm-up of the engine. By providing extra advance as the engine begins to run, and by usig a leaner fuel-air mixture, it has been found that the engine can be efficiently warmed up while at the same time providing improved vehicle driveability during this time.

DESCRIPTION OF FIGS. 3 THROUGH 8

As discussed above, FIG. 3 illustrates two graph plots 182, 184 which typically illustrate the amount of spark timing advance as a function of throttle position under two different ambient temperature conditions. It will be appreciated that for different ambient temperatures there exists a family of similar graph plots which illustrate the attenuation of the throttle advance signal for increasing ambient temperature. The curvature in the two illustrated graph plots 182, 184 is created by a particular linkage connection of the throttle position transducer 150 with the engine throttle. The illustrated circuitry is itself substantially linear. For a given ambient temperature the maximum magnitude of the throttle advance signal, for a condition where the throttle advance signal is determined solely by the throttle position signal, is determined by the value of resistor 179. By making resistor 200 in throttle rate circuit 104 equal to resistor 179, the same maximum throttle advance signal is given when the throttle rate circuit overrides the throttle position circuit so that the throttle advance signal is transiently determined solely by the throttle rate signal. It will be further noted that because the throttle rate signal is derived from the temperature compensated throttle position signal, the throttle rate signal is itself temperature compensated. The basic concept of providing a throttle signal used for the purpose of controlling engine spark timing, and the ancillary concepts reflected in the specific manner in which the disclosed throttle advance signal is developed, provide improved driveability in an engine-driven vehicle.

FIGS. 4 and 5 should be considered together since both relate to the development of the programmed vacuum advance signal. FIG. 4 illustrates a family of graph plots of the magnitude of the programmed vacuum advance signal as a function of time for different magnitudes of engine manifold vacuum. Graph plot 360 illustrates the function for manifold vacuum equal to 13 inches of mercury (Hg.); graph plot 362, for a vacuum equal to 11 inches of mercury; graph plot 364, for a vacuum equal to 10 inches of mercury; graph plot 366, for a vacuum equal to 8 inches mercury; graph plot 368, for a vacuum equal to three inches mercury. The five representative graph plots 360 – 368 are for a condition where accumulation function circuit 108 is counting in the up direction from an initial count of zero to its maximum count. Thus, each of the graph plots 360 – 368 is of a staircase form. It will be observed that all graph plots 360 – 368 begin at a time equal to 50 seconds after the accumulation function circuit 108 has begun to accumulate counts. The reason for this is that the voltage across the base-emitter terminals of transistor 292 in modulation circuit 112 must overcome the PN junction characteristic before the potential at line 293 can begin to rise, as explained above. Thus, once the base-emitter junction of transistor 292 becomes forward biased, then further increments in the count in accumulation function circuit 108 are directly reflected in the increase in the vacuum advance signal. Thus, each of the staircase graph plots 360 – 368 will contain a number of increments somewhat less than the 63 increments which are provided by accumulation function circuit 108. Because accumulation function circuit 108 counts up to a constant frequency, increments in the graph plots 360 – 368 will always occur at the same point in time independently of the magnitude of engine vacuum. However, the magnitude of each increment will depend upon the magnitude of engine vacuum, the magnitude of the increment increasing as the magnitude of vacuum increases. Thus, the graph plots illustrate that maximum vacuum advance signal is reached earlier in time as the magnitude of manifold vacuum increases above the 10 inches of mercury level. For magnitudes of engine vacuum less than 10 inches mercury, the vacuum advance signal does not reach its maximum possible limit of +32° after the maximum count in accumulation function circuit 108 has been reached. Thus, the graph plots 366 and 368 do not increase further after the maximum count in accumulation function circuit 108 has been reached (the maximum count being reached after 300 seconds as illustrively shown). It should also be explained that the illustrated graph plots 360 – 368 are for a condition where the magnitude of resistor 300 is very large, or the resistor is omitted entirely from the circuit. By reducing the resistance of resistor 300, the potential at line 293, for a condition where transistor 292 is not conducting, will increase. This can be used to provide an initial programmed vacuum advance plot, like those shown in FIG. 5, until transistor 292 is forward biased. It should also be appreciated that when accumulation function circuit 108 is counting down, the vacuum advance signal decreases at twice the rate at which it increases because the counting rate at which the accumulation function circuit 108 counts down is doubled.

FIG. 5 illustrates a family of graph plots 370, 372, 374 and 376 each of which shows the vacuum advance signal as a function of manifold vacuum for a given count contained in accumulation function circuit 108. The graph plot 370, labelled full accumulator, illustrates a condition where the maximum count in accumulation function circuit 108 has forced the emitter voltage of Inspection of the first three equations illustrates the fact an identical absolute magnitude change in the slopes $k_1$, $k_2$ and $k_3$ will result in a uniform identical shift of the advance angle versus speed characteristic defined by each of these equations without changing any of the linear rates of change of the advance angle as a function of engine speed. Thus in equation (2), for example, a decrease of 3 volts per second in the slopes $k_1$ and $k_2$ will result in only a constant advance angle shift and will not change the coefficient by which the engine speed term is multiplied. Therefore the rate of advance angle change as a function of speed has been preserved, while the advance angle versus speed characteristic has been shifted in its absolute magnitude. Thus the present invention has provided circuitry for producing both of the advance curves illustrated in FIG. 2, since the vacuum sensor 35 will uniformly change the slopes $k_1$, $k_2$ and $k_3$ and this will result in the creation of an advance characteristic corresponding to graph 51.

The reason for forcing a zero advance angle for engine speeds which are below a certain predetermined speed, is to prevent the slope generator 32 and comparator 39 from creating any spark timing signal at all when the engine speed is below a predetermined level. If the half cycle period $T_{A/2}$ is extremely long, either the voltage across the capacitor 121 would level off at a maximum of B+ volts and therefore create a nonlinearity which would result in the creation of inaccurate spark timing signals or the voltage across the capacitor 121 would never be decreased to a voltage equal to the threshold level of the comparator 135 and a spark timing signal would never occur at the terminal 40. Either of these two undesirable results is prevented by the inclusion of a $T_3$ detection means in the timer circuit 34 and the use of the diodes 35' and 42.

In understanding the equations 1 through 4 it will be helpful to remember that the cycle time $T_A$ of the input signal 52 produced by the sensor 30 is also a function of engine speed. This relationship can be represented by:

$$T_A = 120/CN \qquad (5)$$

where $T_A$ is expressed in seconds.

While the preferred embodiment of the present invention has been described with reference to a four cylinder internal combustion engine in which two ignition coils are used to alternately excite each of the four cylinders, the present invention can easily be expanded to six and eight cylinder engines and to the use of separate ignition coils for providing spark signals for each of the cylinders. Also, the positive and negative cycles of the input signal do not have to be equal to each other in time duration.

While I have shown and described specific embodiments of this invention, further modifications and improvements will occur to those skilled in the art. All such modifications which retain the basic underlying principles disclosed and claimed herein are within the scope of this invention.

I claim:

1. A multiple slope ignition spark timing circuit for an internal combustion engine comprising:
   sensor means for generating an AC input signal having a frequency proportional to the rotational speed of an engine, said input signal having alternate positive and negative cycles with respect to a predetermined reference level, each of said cycles corresponding to predetermined amounts of angular rotation of the engine;
   means for receiving said AC input signal and producing a first signal, after each commencement of one of said positive and negative cycles, which is varying at a first predetermined rate of change;
   means coupled to said sensor means for receiving said input signal and detecting the passage of at least a first predetermined period of time within a first predetermined amount of angular rotation of the engine after each commencement of one of said cycles, said first predetermined amount of angular rotation being at most equal to the angular rotation corresponding to one positive and one negative cycle;
   means coupled to said first signal producing means for altering the rate of change of said first signal to a second predetermined rate of change in response to the occurrence of a detection of said first time period within said first amount of angular rotation; and
   means, including comparison means, coupled to said first signal producing means for producing a spark timing ignition signal by utilizing the magnitude of said first signal with respect to an engine speed independent reference level to produce an engine speed variable phase difference between said spark timing signal and said input signal, a first spark timing phase difference versus engine speed relationship depending on said first rate of change existing when the engine speed is above a predetermined speed at which said first time interval equals the time required for said first predetermined amount of angular rotation of the engine, and a second relationship depending on both said first and second rates of change existing when the engine speed is below said predetermined speed.

2. A multiple slope ignition spark timing circuit according to claim 1 which includes means coupled to said first signal producing means for equally simultaneously adjusting both of said first and second rates of change of said first signal in accordance with the magnitude of a variable external signal and thereby equally offsetting both of said first and second spark timing versus speed relationships by an engine speed independent predetermined amount of phase corresponding to the magnitude of said variable external signal while maintaining the same phase versus engine speed variation.

3. A multiple slope ignition spark timing circuit according to claim 2 which includes means coupled to said adjusting means for varying the magnitude of said external signal in accordance with the amount of vacuum advance angle required by the engine.

4. A multiple slope ignition spark timing circuit according to claim 1 in which said detecting means includes circuitry for detecting the passage of a second predetermined period of time within said first predetermined amount of angular rotation of the engine after each commencement of said one of said cycles; and in which said first signal altering means includes circuitry for altering the rate of change of said first signal to a third predetermined rate in response to the detection of said second time period, said second time period being greater than said first time period.

5. A multiple slope ignition spark timing circuit according to claim 4 wherein said first predetermined amount of angular rotation corresponds to one of said positive and negative cycles of said input signal; and wherein said first, second and third rates of change of said first signal all have the same polarity.

6. A multiple slope ignition spark timing circuit for an internal combustion engine comprising:
   sensor means for generating an AC input signal having a frequency proportional to the rotational speed of an engine, said input signal having alternate positive and negative cycles with respect to a predetermined reference level;
   means for receiving said AC input signal and producing a first signal, after each commencement of one of said positive and negative cycles, which is varying at a first predetermined rate of change;
   means coupled to said sensor means for receiving said input signal and detecting the passage of at least a first predetermined period of time within a first predetermined amount of angular rotation of the engine after each commencement of said one of said cycles;
   means coupled to said first signal producing means for altering the rate of change of said first signal to a second predetermined rate of change in response to the occurrence of a detection of said first time period within said first amount of angular rotation;
   means coupled to said first signal producing means for producing a spark timing ignition signal by utilizing the magnitude of said first signal to produce a phase difference between said spark timing signal and said input signal which is a function of engine speed, whereby a first spark timing phase difference versus engine speed relationship exists when the engine speed is above a predetermined speed at which said first time interval equals the time required for said predetermined amount of angular rotation and a second relationship exists when the engine speed is below said predetermined speed;
   said detecting means including circuitry for detecting the passage of a second predetermined period of time within said first predetermined amount of angular rotation of the engine after each commencement of said one of said cycles; said first signal altering means including circuitry for altering the rate of change of said first signal to a third predetermined rate in response to the detection of said second time period, said second time period being greater than said first time period;
   and wherein said first predetermined amount of angular rotation corresponds to one of said positive and negative cycles of said input signal, and said first, second and third rates of change of said first signal all have the same polarity,
   and wherein said first signal producing means includes circuitry for varying said first signal at a fourth predetermined rate, having a polarity opposite to the polarities of said first, second and third rates, during the other of said positive and negative cycles of said input signal.

7. A multiple slope ignition spark timing circuit according to claim 6 in which said spark timing signal producing means includes means for comparing said first signal during said other cycle of said input signal to a predetermined signal level and producing a first timing pulse in response to the magnitude of said first signal equaling said predetermined level.

8. A multiple slope ignition spark timing circuit according to claim 7 which includes a flip-flop circuit having an input terminal coupled to said comparing means for receiving said first timing pulse, said flip-flop circuit having at least one output terminal coupled to a spark gap of a cylinder of the engine.

9. A multiple slope ignition spark timing circuit according to claim 8 which includes a position sensor means for producing a signal related to the rotational position of the engine, said position sensor means being coupled to another input terminal of said flip-flop circuit whereby the production of a spark signal at the output of said flip-flop circuit depends upon said first timing pulse and the synchronization of the rotational position of the engine.

10. A multiple slope ignition spark timing circuit according to claim 9 wherein said flip-flop is a D type flip-flop with the output of said comparing means coupled to a clock terminal of the flip-flop and said position sensor means coupled to a data input terminal of the flip-flop.

11. A multiple slope ignition spark timing circuit according to claim 7 wherein said spark timing signal producing means includes a summing terminal coupled to both the output of said comparing means and said AC input signal producing sensor means, whereby signals at said summing terminal can be supplied by both said comparing means and said sensor means and these signals are used to create said spark timing signals.

12. A multiple slope ignition spark timing circuit according to claim 11 wherein said summing terminal is coupled to the output of said comparing means and said AC input signal producing sensor means by separate diodes.

13. A multiple slope ignition spark timing circuit according to claim 7 wherein said first signal producing means includes a capacitor and circuitry for controllably charging and discharging said capacitor.

14. A multiple slope ignition spark timing circuit according to claim 13 wherein said first signal producing means includes a current source means coupled to said input signal for controlling the rate of charge/discharge of said capacitor during said cycles of said input signal.

15. A multiple slope ignition spark timing circuit according to claim 14 wherein said first time period detecting means is coupled to said current source means for altering the rate of charge/discharge of said capacitor in response to the detection of a first time period.

16. A multiple slope ignition spark timing circuit according to claim 15 which includes an engine vacuum sensor means coupled to said current source means for controlling the charging/discharging of said capacitor in accordance with the magnitude of the vacuum produced by the engine.

17. A multiple slope ignition spark timing circuit according to claim 15 wherein said first time period detecting means includes a timing capacitor coupled to said input signal producing sensor means and a voltage comparator means coupled to said timing capacitor for producing a signal at said first period of time after the commencement of said one of said input cycles.

18. A multiple slope ignition spark timing circuit according to claim 17 wherein said AC signal producing sensor means is a magnetic pick-up.

19. A multiple slope ignition spark timing circuit according to claim 15 which includes means coupled to said input signal producing sensor means for detecting a third time period, larger than said second time period, during said one of said cycles.

20. A multiple slope ignition spark timing circuit according to claim 19 wherein said third time detection means includes circuitry for inhibiting said comparing means once a third time period has been detected and until said third time period means has been reset.

21. A multiple slope ignition spark timing circuit according to claim 20 which includes circuitry for resetting said third time period in response to the commencement of another one of said one of said cycles.

22. A multiple slope ignition spark timing circuit according to claim 1 wherein said time detection means includes means coupled to said input signal producing sensor means for detecting a third time period, larger than said first time period, during each of said one of said cycles, and circuitry for inhibiting said comparison means once a third time period has been detected and until said third time period detection means has been reset, whereby said comparison means is disabled for engine speeds below a predetermined speed so that a constant amount of phase for the spark timing signal can be provided.

23. A multiple slope ignition spark timing circuit according to claim 22 which includes circuitry for resetting said third time period means in response to the commencement of another one of said one of said cycles.

24. A multiple slope ignition spark timing circuit according to claim 23 wherein said spark timing signal producing means includes circuitry for providing a fixed phase difference between said spark timing signal and said input signal for all engine speeds below a predetermined speed at which said one of said cycles equals said third time period.

25. A multiple slope ignition spark timing circuit according to claim 24 wherein said fixed phase difference is zero.

26. A multiple slope ignition spark timing circuit for an internal combustion engine comprising:
    sensor means for generating an AC input signal having a frequency proportional to the rotational speed of an engine, said input signal having alternate positive and negative cycles with respect to a predetermined reference level, each of said cycles corresponding to predetermined amounts of angular rotation of the engine;
    means for receiving said AC input signal and producing a first signal, during each of one of said positive and negative cycles, which is varying at a first predetermined rate of change;
    means coupled to said sensor means for receiving said input signal and detecting the passage of at least a first predetermined period of time within a first predetermined amount of angular rotation of the engine after said first signal is produced said first predetermined amount of angular rotation being at most equal to the angular rotation corresponding to one positive and one negative cycle;
    means coupled to first signal producing means for altering the rate of change of said first signal from said first rate of change to a second predetermined rate of change in response to the occurrence of a detection of said first time period within said first amount of rotation;
    means, including a comparison means, coupled to said first signal producing means for producing a spark timing ignition signal by utilizing the magnitude of said first signal at the end of said predetermined amount of angular rotation with respect to the production of said first signal to produce a phase difference between said spark timing signal and said input signal which is a function of engine speed, a first spark timing phase difference versus engine speed relationship depending on said first rate existing when the engine speed is above a predetermined speed at which said first time interval equals the time required for said predetermined amount of angular rotation and a second relationship depending on both said first and second rates existing when the engine speed is below said predetermined speed.

27. A multiple slope ignition spark timing circuit according to claim 26 wherein said first signal producing means includes a capacitor and circuitry for controllably charging/discharging said capacitor to create said first signal.

28. A multiple slope ignition spark timing circuit according to claim 27 wherein said first signal altering means alters the rate of charge/discharge of said capacitor in response to the detection of said first time period.

29. A multiple slope ignition spark timing circuit according to claim 28 which includes an engine vacuum sensor means coupled to said first signal producing means for controlling the rate of charging/discharging of said capacitor in accordance with the magnitude of the vacuum produced by the engine.

30. A multiple slope ignition spark timing circuit according to claim 27 wherein said first time period detecting means includes a timing capacitor having its charge altered at a predetermined rate during each of said one of said input cycles, and a voltage comparator means coupled to said timing capacitor for producing a signal at said first period of time after the commencement of said one of said input cycles.

31. A multiple slope spark timing ignition circuit according to claim 27 wherein said predetermined amount of angular rotation corresponds to each of one of said positive and negative cycles and wherein said spark signal producing means includes circuitry for altering the rate of charge/discharge of said capacitor at a third predetermined rate during each of the other of said positive and negative cycles, said first and second rates having the same polarity and said third rate having the opposite polarity.

32. A multiple slope ignition spark timing circuit for an internal combustion engine comprising:
    sensor means for generating an AC input signal having a frequency proportional to the rotational speed of an engine, said input signal having alternate positive and negative cycles with respect to a predetermined reference level;
    means for receiving said AC input signal and producing a first signal which is unidirectionally varying during one of said positive and negative cycles, including circuitry for initially varying said first signal in said one cycle at a first predetermined rate of change having a predetermined polarity;
    means coupled to said sensor means for detecting the passage of at least a first predetermined period of time during said one of said cycles;
    means coupled to said first signal producing means for altering the rate of change of said first signal during said one of said positive and negative cycles from said first rate of change to a second predetermined rate having the same polarity as said first predetermined rate in response to the occurrence of a detection of said first time period during said one of said cycles;

means for varying said first signal at a third predetermined rate which has a polarity opposite to that of said first and second rates during the other of said positive and negative cycles; and means, including a comparison means, coupled to said first signal producing means for producing a spark timing ignition signal by utilizing the magnitude of said first signal at the end of said one of said cycles to produce a phase difference between said spark timing signal and said input signal, a first spark timing phase difference versus engine speed relationship existing when the engine speed is above a predetermined speed at which said first time interval equals said one of said cycles of the input signal and a second relationship existing when the engine speed is below said predetermined speed.

33. A multiple slope ignition spark timing circuit according to claim 32 which includes means coupled to said first signal producing means for equally simultaneously adjusting both of said first and second rates of change of said first signal in accordance with the magnitude of a variable external signal and thereby equally offsetting both of said first and second spark timing versus sped relationships by an engine speed independent predetermined amount of phase corresponding to the magnitude of said variable external signal while maintaining the same phase versus engine speed variation.

34. A multiple slope ignition spark timing circuit according to claim 33 which includes means coupled to said adjusting means for varying the magnitude of said external signal in accordance with the amount of vacuum advance angle required by the engine.

35. A multiple slope ignition spark timing circuit according to claim 32 in which said comparison means compares said first signal during said other cycle of said input signal to a predetermined signal level and produces a first timing pulse in response to the magnitude of said first signal equaling said predetermined level.

36. A multiple slope ignition spark timing circuit according to claim 35 in which said spark timing signal producing means includes a flip-flop circuit having an input terminal coupled to said comparison means for receiving said first timing pulse, said flip-flop circuit having at least one output terminal coupled to a spark gap of a cylinder of the engine and wherein said spark timing signal producing means includes a position sensor means for producing a signal related to the rotational position of the engine, said position sensor means being coupled to another input terminal of said flip-flop circuit whereby the production of a spark signal at the output of said flip-flop circuit depends upon said first timing pulse and the rotational position of the engine as provided by the position sensor signal.

37. A multiple slope ignition spark timing circuit according to claim 35 wherein said spark timing signal producing means includes a summing terminal coupled to both the output of said comparison means and said input signal sensor means, a composite signal at said summing terminal being created by both said comparison means and said input signal sensor means and this signal being used to create said spark timing signal.

* * * * *

UNITED STATES PATENT AND TRADEMARK OFFICE
CERTIFICATE OF CORRECTION

PATENT NO. : 4,104,997
DATED : August 8, 1978
INVENTOR(S) : KENNETH WARREN PADGITT It is certified that error appears in the above-identified patent and that said Letters Patent are hereby corrected as shown below:

Column 9, line 6, please delete the serial number "537,725" and insert the serial number --537,726--.

Signed and Sealed this

Fourth Day of March 1980

[SEAL]

Attest:

SIDNEY A. DIAMOND

Attesting Officer

Commissioner of Patents and Trademarks